United States Patent [19]

Yamamoto

[11] Patent Number: 4,539,466
[45] Date of Patent: Sep. 3, 1985

[54] ELECTRIC HEATING APPARATUS FOR DISSIPATING FOG FROM A WINDOW

[75] Inventor: Yukio Yamamoto, Zama, Japan

[73] Assignee: Nissan Motor Co., Ltd., Yokohama, Japan

[21] Appl. No.: 573,623

[22] Filed: Jan. 25, 1984

[30] Foreign Application Priority Data

Jan. 28, 1983 [JP] Japan .................................. 58-11377

[51] Int. Cl.³ ............................................. H05B 1/02
[52] U.S. Cl. ...................................... 219/203; 52/171; 219/517; 219/522; 219/547
[58] Field of Search ............... 219/203, 522, 547, 517; 52/171

[56] References Cited

U.S. PATENT DOCUMENTS

| | | | |
|---|---|---|---|
| 3,858,027 | 12/1974 | Phillips | 219/203 |
| 3,944,893 | 3/1976 | Hayden | 219/203 X |
| 3,973,140 | 8/1976 | Phillips | 219/203 X |
| 4,132,881 | 1/1979 | Ciarniello et al. | 219/203 |

Primary Examiner—A. Bartis
Attorney, Agent, or Firm—Schwartz, Jeffery, Schwaab, Mack, Blumenthal & Evans

[57] ABSTRACT

An electric current feeding to an electric heating unit designed for dissipating a fog formed on a glass window of a vehicle by its thermal effect. The apparatus has one fuse connected with an ignition switch and two fuses connected with input terminals of an electromagnetic relay having two contacts for connection with a heating unit in parallel. The electromagnetic relay is actuated by the ignition switch through an electric timer activated by a manual defogger switch. An electric current feeding system is provided for protecting the contacts of the electromagnetic relay from a short-circuit by melting or breakage by arranging the same such that the manual defogger switch, timer and relay are connected with the vehicle power source through one of the three fuses, respectively. Thereby the apparatus can be rendered entirely inoperative when any one of three fuses is blown, or the circuit connected therewith is disconnected.

11 Claims, 4 Drawing Figures

ELECTRIC HEATING APPARATUS FOR DISSIPATING FOG FROM A WINDOW

BACKGROUND OF THE INVENTION

The present invention relates to an improvement in an electric current supply or feeding apparatus, and more particularly to an apparatus having a heating unit for dissipating condensed moisture or fog from a window of a vehicle.

A known heating unit for use on a vehicle includes a heating element, for example heating wire, arranged in a rear glass window for dissipating fog therefrom by heat generation.

FIG. 1 shows one example of a conventional apparatus which has been used for feeding electric current to a defogger. In FIG. 1, there are shown a power source 1, an ignition switch 2, a fuse F1 connected to the ignition switch 2 in series and a fuse F2 connected to the power source 1 in series, the fuses F2 and F1 being connected to an input terminal 6 of a contact 4 and an exciting coil 18 respectively in an electromagnetic relay 3. The electromagnetic relay 3 has its output terminal 8 connected to a defogger 10 and an indicator lamp 11. A defogger starting switch 12 for actuating the electromagnetic relay 3 has its ON contact 13 connected to the fuse F1 and its OFF contact 14 connected to ground. A manipulation knob 15 of the starting switch 12 is designed to automatically return back to its neutral position after connection with the ON contact 13 or the OFF contact 14. An electronic timer 16 is adapted to respond to a signal from the starting switch 12 to actuate the electromagnetic relay 3 for a preset duration. A power input terminal 17 of the electronic timer 16 is connected with the fuse F1. The exciting coil 18 of the electromagnetic relay 3 has its one end connected with the fuse F1 and its other end with the electronic timer 16 respectively.

To actuate the prior art apparatus, the driver turns on the ignition switch 2 thus enabling operation, and then operates the manipulation knob 15 of the starting switch 12 provided on a front of instrument panel (not shown) of the vehicle, thus causing manipulation knob 15 to come into contact with the ON contact 13. As a result, a timer actuation signal is generated by the starting switch 12 and sent to the electronic timer 16 for actuating the timer 16, and while the timer 16 is operating, electric current flows to the energizing coil of the electromagnetic relay 3. The electromagnetic relay 3 closes contact 4 during this situation. In consequence, electric current flows from the power source 1 to the electromagnetic relay 3 via the fuse F2, and is further sent therefrom to the heating unit 10 and to the indicator lamp 11. Upon the end of the preset duration, or when the timer 16 stops, the flow of electric current to the exciting coil 18 is interrupted with a simultaneous turning off the electromagnetic relay 3. The length of time for which the timer 16 continues to operate is preset to be sufficient for the heating unit 10 to heat and dissipate fog formed on the rear glass window, and normally it is preferable to preset the duration, for example, to 10 to 15 minutes. If fog has disappeared intermediately during operation of the apparatus, the driver may operate the manipulation knob 15 of the starting switch 12 to come into contact with the OFF contact 14, thereby causing the timer 16 to cease its operation for interrupting the flow of electric current to the heating unit 10.

There is a need for a larger electric current and increased current capability of the electromagnetic relay and the fuses when the defogger is being used in a freezing region and the like, i.e., a geographical region in which freezing climatic conditions may exist. To cope with such a need, a circuit arrangement shown in FIG. 2 may be used, if it is desired to reduce production costs by using electromagnetic relays and the fuses such as are generally otherwise employed in vehicles. In this arrangement the electromagnetic relay 19 having two contactors 4 and 5 is used for feeding electric current to the heating unit 10, while two fuses F2 and F3 are arranged in parallel for achieving increased fuse capacity in a manner that two circuits are arranged in parallel. In this instance, if either fuse F2 or F3 is blown, or disconnection is caused in either circuit, a remaining fuse will be also blown, because it will be subjected to the flow of all of the electric current formerly divided between the contacts 4 and 5 of the electromagnetic relay 19. Namely, at the moment of connecting the starting switch 12 with the ON contact 13, a large inflow of electric current takes place to another circuit sufficiently for blowing the fuse connected thereto. As a result, the heating unit 10 remains cold and the indicator lamp 11 also remains unlighted, thereby informing the driver of the breakdown of the electric current feeding apparatus.

However, the circuit arrangement mentioned above presents a problem in that heating unit 10, which is mainly made of silver and so exhibits the inherent temperature characteristics of silver in general, is liable to vary its electric resistance, depending on ambient temperature. That is the, electrical resistance of the heating unit 10 becomes high if ambient temperature becomes high, thereby preventing a large electric current from passing abruptly through the fuses F2 and F3, and the contacts 4 and 5 of the electromagnetic relay 19. Consequently, in a case where electrical resistance of the heating unit 10 increases its electric resistance in excess of a preset level, there occurs a phenomenon that a single remaining fuse will not be blown, even if all electric currents to the heating unit 10 flow into one circuit exclusively. A resultant larger inflow of electric current to the electromagnetic relay 19 in excess of an allowable limit for the relay contacts connected to the remaining fuse causes the defect that the contacts may be damaged or held in their ON condition by melting.

SUMMARY OF THE INVENTION

The present invention has been made in view of the problems as described above.

An object of the invention is to provide an electric current feeding apparatus having a high current capability.

Another object of the invention is to provide an electric current feeding apparatus which is constructed such that when at least one of the fuses in the apparatus is blown or a circuit connected therewith is disconnected, the apparatus is rendered entirely inoperative, thereby positively preventing the electromagnetic relay from producing a short-circuit by melting or breaking at its contact.

These and other objects and advantages are accomplished by provision of an electric current feeding apparatus comprising a relay, a timer, a starting switch and three fuses, wherein electric current feeding the relay, timer or starting switch is cut off when one of the fuses is blown. More specifically, the present invention includes a power source, at least one relay connected to the power source through a first fuse, an electric timer connected to the power source through a second fuse, and switching means connected to the power source through a third fuse. Two of the fuses are also in series with the heating unit through the relay. Thus, if any of the fuses blows or the circuit containing the fuse becomes otherwise inoperative, the entire apparatus becomes inoperative. This avoids the aforementioned situation in which one of two parallel branches for supplying current to the heating unit is interrupted, leaving the remaining branch to carry twice the normal amount of current.

A more complete understanding of the invention and its advantages will be apparent from the specification and claims in conjunction with the accompanying drawings.

DESCRIPTION OF THE PREFERRED EMBODIMENTS

Figure 1:
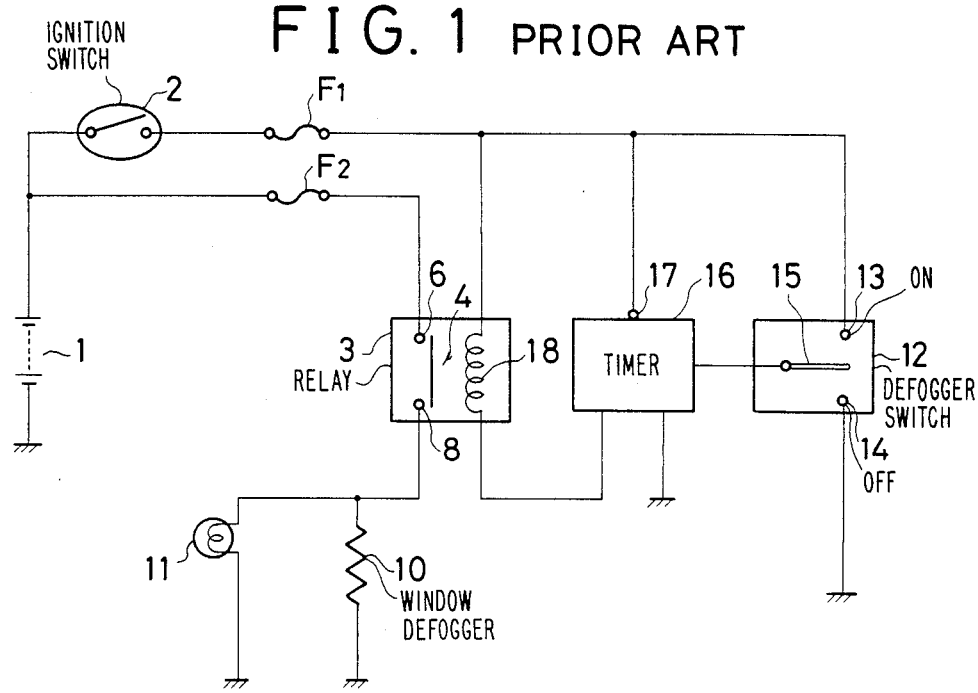
FIG. 1 is a circuit diagram of one example of conventional electric current feeding apparatus for a heating unit.
Figure 2:
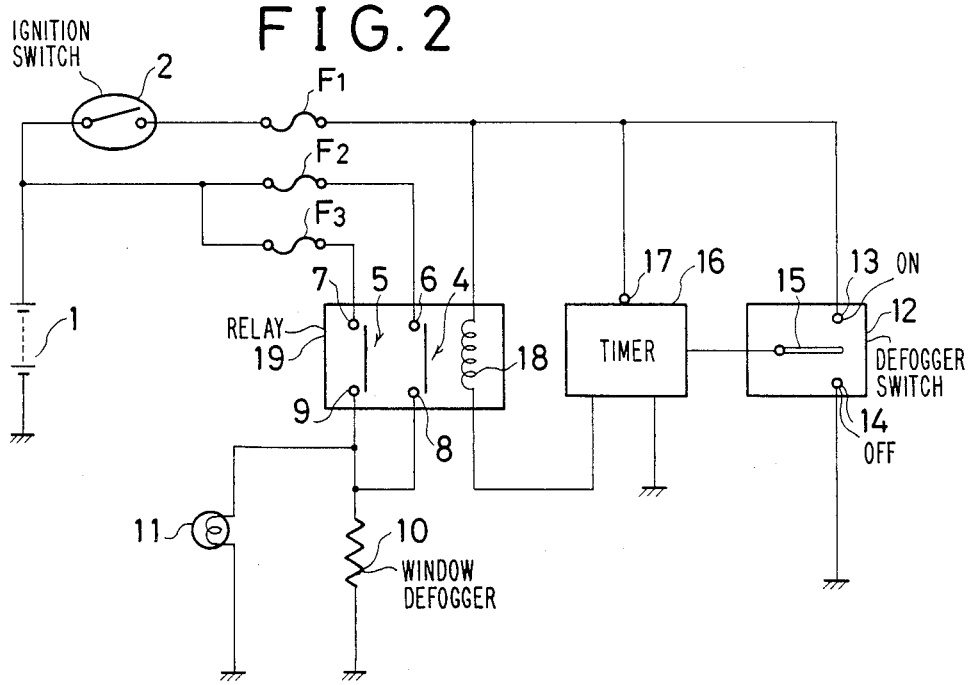
FIG. 2 is a circuit diagram of conventional improvement of the apparatus of FIG. 1.
Figure 3:
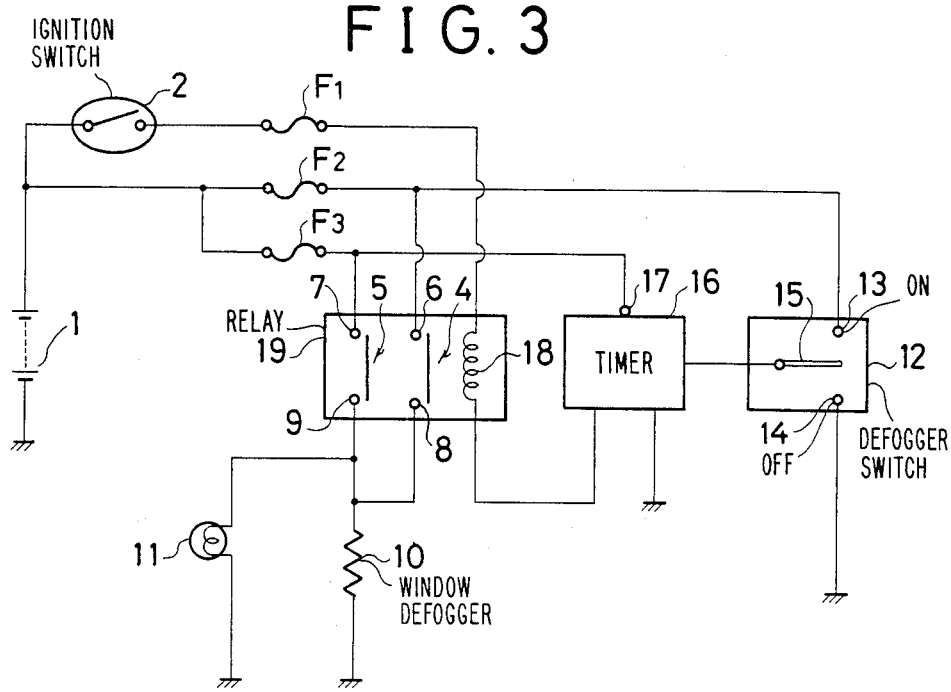
FIG. 3 is a circuit diagram of a first embodiment of the electric current feeding apparatus in accordance with the present invention.

Referring to FIG. 3, there is shown a first embodiment of the present invention. An electric feeding apparatus illustrated in FIG. 3 is essentially of the same structure as that in a conventional apparatus.

In this figure, there are shown a power source 1, an ignition switch 2, a fuse F1 connected with the ignition switch 2 in series, and fuses F2 and F3 respectively connected with the power source 1 in series, these fuses F2 and F3 being connected with input terminals 6 and 7 of an electromagnetic relay 19 including two contacts 4 and 5. The electromagnetic relay 19 has its output terminals 8 and 9 each of which is connected with a heating unit 10 made of a heating wire, for example a heating wire arranged in the rear glass window of a vehicle and an indicator lamp 11. Unlike a conventional apparatus, the apparatus in accordance with the present invention has its three fuses F1, F2 and F3 connected, respectively, at one end thereof with an energizing coil 18 of the electromagnetic relay 19, an ON contact 13 of a defogger starting switch 12 and a power input terminal 17 of a timer 16 respectively. The starting switch 12 comprises its ON and OFF contacts 13, 14 and a manipulation knob 15 similar to that of the conventional apparatuses.

Operating sequence of the electric current feeding apparatus as illustrated in FIG. 3 is the same as that for a conventional apparatus. That is, by turning on the starting switch 12, a timer actuation signal is sent from the starting switch 12 to the timer 16, and the energizing coil 18 is fed an electric current. In consequence, the electromagnetic relay 19 closes its contacts 4 and 5, thereby feeding electric current to the defogger 10 for heating up the same with attendant lighting of the indicator lamp 11.

Next, description will be made concerning how the apparatus functions in the event that one of three fuses F1, F2 or F3 is blown, or one circuit connected therewith is disconnected.

In such a case that the fuse F1 is blown, or the circuit connected therewith is disconnected, electric current does not flow to the energizing coil 18 irrespective of the condition of the timer 16 even after the ignition switch 2 is turned on, and consequently the electromagnetic relay 19 remains inoperative even though a manipulation knob 15 of the starting switch 12 is connected with the ON contact 13. The driver notices breakdown of the apparatus from resultant inactivity of the heating unit 10 or the indicator lamp 11.

In the event that the fuse F2 is blown, or the circuit connected therewith is disconnected, an attempt to actuate the starting switch 12 by turning it on fails in generating a timer actuation signal due to absence of electric current inflow to the starting switch 12. Since the timer 16 remains inoperative, electric current does not flow into the energizing coil 18 and contacts 4 and 5 of the electromagnetic relay 19 are held open, thereby interrupting an inflow of electric current to the heating unit 10. In the meantime, if the fuse F2 is blown while the apparatus is in operation, the energizing coil 18 can continue to operate under unchanged inflow of electric current for the preset duration preset by the timer 16, because the timer 16, once started, is unaffected by a blown fuse. However, the driver notices breakdown of the apparatus from the lamp 11 which remains unlighted upon an attempt to actuate the apparatus again after the preset duration.

In the event that the fuse F3 is blown, or the circuit connected therewith is disconnected, the timer 16 remains inoperative even through the starting switch 12 inputs a timer actuation signal to the timer 16, because of absence of electric current inflow to the timer 16. As a result, no inflow of electric current takes place to the energizing coil 18 and consequently to the heating unit 10. Meanwhile, if the fuse F3 is blown while the apparatus is operating, the timer 16 becames inoperative and the relay 19 is turned off. Therefore the driver can infer breakdown of the apparatus from the extinguishment of the lamp 11.

Figure 4:
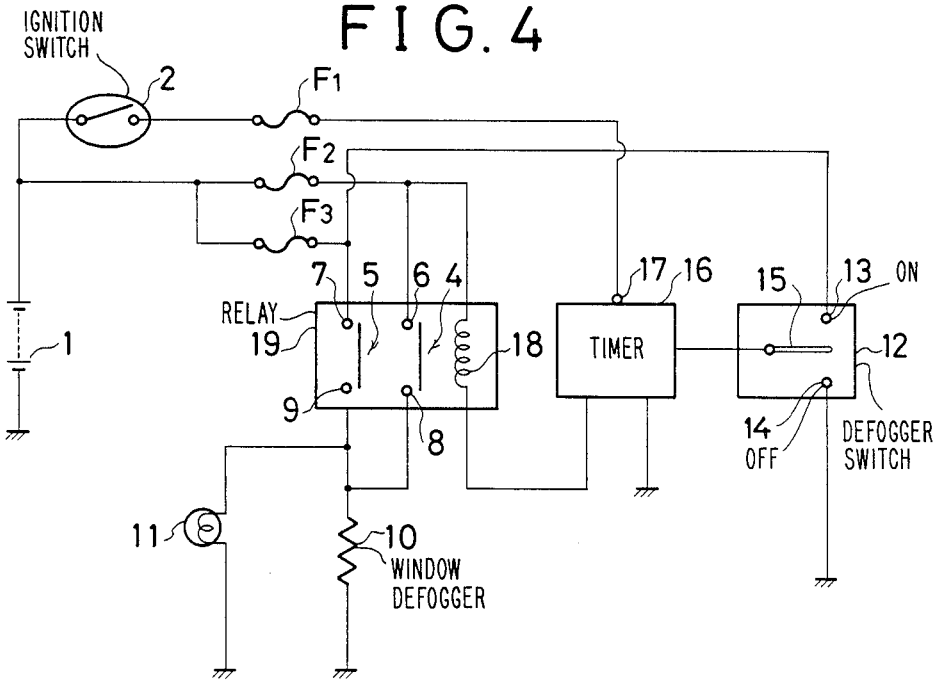
FIG. 4 is a circuit diagram of a second embodiment of the electric current feeding apparatus in accordance with the present invention.

FIG. 4 shows a second embodiment of the present invention, wherein an electric circuit arrangement is the same as that of the first embodiment with the exception that the fuse F1 is connected, not with the energizing coil 18 as in the first embodiment, but with the power input terminal 17 of the timer 16; and the fuse F2 is connected with one contact 4 of the electromagnetic relay 19 as in the first embodiment and also with one end of energizing coil 18, and the fuse F3 is connected, not with the power input terminal 17 of the timer 16 as in the first embodiment, but with the ON contact 13 of the starting switch 12.

As a result, in the event of one of the fuses F1, F2 and F3 as arranged in the second embodiment being blown, the timer 16, the energizing coil 18 or the defogger starting switch 12 will not function at all and thus the electromagnetic relay 19 is held inoperative. It is accordingly possible for the driver to notice breakdown of the apparatus exactly as in the first embodiment.

Furthermore, a similar effect can be obtained by differently incorporating the present invention such that the fuse F1 is connected with the starting switch 12, and fuses F2 and F3 are respectively connected with contacts 4 and 5 of the electromagnetic relay 19, and also with the energizing coil 18 and with the timer 16.

While the second embodiment has been explained hereinbefore for the case where the electromagnetic relay having two contacts thereon is used, it is possible to alter this embodiment by arranging two electromagnetic relays and by employing various types of timer. Moreover, the heating unit having its heating wire arranged in the rear glass window is not an essential feature of the heating unit in accordance with the present invention, and it is also possible to incorporate the concept of the present invention as an electric heating apparatus adapted to serve a heating unit having its wire arranged in a side glass window or in a slidable roof glass or the like.

As explained hereinbefore, the electric heating apparatus in accordance with the present invention has its circuit arranged such that when any of two fuses each connected with two contacts of the electromagnetic relay, or one fuse connected with the ignition switch is caused to blow, or when a circuit connected with one of the above fuses is disconnected, while the electromagnetic relay with two contacts provided thereon is connected with the defogger for feeding electric current thereto, the apparatus is held inoperative, and thus breakdown of the apparatus can be quickly observed by the driver, thereby eliminating the risk for the electromagnetic relay to cause a short-circuit by melting or breakage at its contact. In this way, the arrangement incorporated in accordance with the present invention can secure safety throughout the electric circuit.

What is claimed is:

1. An electric heating apparatus for dissipating fog from a window, said apparatus comprising:
    a power source;
    at least one electromagnetic relay actuated by electric current through a first fuse from said power source;
    an electric timer actuated by electric current through a second fuse from said power source, said timer being arranged in circuit with said relay to actuate said relay;
    a switching means for actuating said timer, said timer being actuated by electric current supplied thereto by said switching means through a third fuse from said source;
    a first contact means provided in said relay and connected with said power source at its input terminal through one of said first, second and third fuses;
    a second contact means provided in said relay and connected with said power source at its input terminal through another one of said first, second and third fuses; and
    an electric heating unit associated with said window and connected with the output terminals of said first and second contact means.

2. An electric heating apparatus of claim 1, further comprising an indicator lamp connected with said output terminals of said first and second contact means.

3. An electric heating apparatus of claim 2, wherein, said first fuse is connected with said power source through an ignition switch.

4. An electric heating apparatus of claim 3, wherein, said heating unit is applied to a glass window of vehicle.

5. An electric heating apparatus of claim 4, wherein, said heating unit is arranged in a rear glass window for disipating fog therefrom.

6. An electric heating apparatus of claim 4, wherein, said electromagnetic relay includes an energizing coil connected with said power source through said first fuse.

7. An electric heating apparatus of claim 4, wherein, said electromagnetic relay includes an energizing coil connected with said power source through said second fuse.

8. An electric heating apparatus of claim 6, wherein, said first contact means is connected with said power source through said second fuse, and said second contact means is connected with said power source through said third fuse.

9. An electric heating apparatus of claim 6, wherein, said first contact means is connected with said power source through said first fuse, and said second contact means is connected with said power source through said third fuse.

10. An electric heating apparatus of claim 4, wherein, said heating unit is a heating wire.

11. An electric heating apparatus for dissipating fog from a window comprising:
    a power source;
    an electromagnetic relay operable only when connected to said power source and having a pair of actuating terminals and first and second contact means;
    a timer connected to one of said pair of actuating terminals of said relay and operable only when connected to said power source to actuate said relay by closing said first and second contact means for a predetermined duration when the other of said pair of actuating terminals is connected to said power source;
    switching means connected to said timer for selectively initiating and terminating operation of said timer only when said switching means is connected to said power source;
    a first fuse connecting said other of said first and second actuating terminals to said power source;
    a second fuse connecting said timer to said power source;
    a third fuse connecting said switching means to said power source; and
    a heating unit;
    said first contact means being connected to supply current from said power source to said heating unit through one of said first, second, and third fuses; and
    said second contact means being connected to supply current fromsaid power source to said heating unit through another one of said first, second, and third fuses, whereby if any of said first, second, and third fuses blows, the current supply becomes inoperative without subjecting the remaining fuses and said first and second contact means to excessive current loads.

* * * * *